United States Patent
Dykes et al.

(10) Patent No.: US 9,545,094 B2
(45) Date of Patent: Jan. 17, 2017

(54) REMOTE-ACTIVATED ANIMAL TRAP

(71) Applicants: Scott Dykes, Bean Station, TN (US); Randall Dykes, Telford, TN (US); Ralph Hickle, New Market, TN (US)

(72) Inventors: Scott Dykes, Bean Station, TN (US); Randall Dykes, Telford, TN (US); Ralph Hickle, New Market, TN (US)

( * ) Notice: Subject to any disclaimer, the term of this patent is extended or adjusted under 35 U.S.C. 154(b) by 183 days.

(21) Appl. No.: 14/474,739

(22) Filed: Sep. 2, 2014

(65) Prior Publication Data

US 2015/0059234 A1    Mar. 5, 2015

Related U.S. Application Data

(60) Provisional application No. 61/872,286, filed on Aug. 30, 2013.

(51) Int. Cl.
  *A01M 23/00*    (2006.01)
  *A01M 23/20*    (2006.01)

(52) U.S. Cl.
  CPC ..................................... *A01M 23/20* (2013.01)

(58) Field of Classification Search
  CPC ........................................................ A01K 1/02
  See application file for complete search history.

(56) References Cited

U.S. PATENT DOCUMENTS

| | | | | |
|---|---|---|---|---|
| 6,427,286 B1* | 8/2002 | Erskine | ................... | B63B 43/26 16/90 |
| 8,061,076 B2* | 11/2011 | Kelley | ................... | A01M 23/20 43/58 |
| 8,210,128 B1* | 7/2012 | Lato | ..................... | A01K 1/0017 119/14.03 |
| 8,359,783 B1* | 1/2013 | Kamery | ................ | A01M 23/16 43/58 |
| 8,407,930 B2* | 4/2013 | Dekalb | ................ | A01M 23/20 43/61 |
| 8,413,368 B2* | 4/2013 | Dekalb | ................. | A01M 23/20 43/61 |
| 2010/0242338 A1* | 9/2010 | Facklam | ............... | A01M 23/20 43/61 |
| 2011/0167709 A1* | 7/2011 | Pinkston | ............... | A01M 23/20 43/61 |
| 2012/0117850 A1* | 5/2012 | Panovic | ................. | A01K 74/00 43/4.5 |
| 2015/0296766 A1* | 10/2015 | Gaskamp | .............. | A01M 23/22 43/61 |

* cited by examiner

*Primary Examiner* — Kristina Junge
(74) *Attorney, Agent, or Firm* — Pitts & Lake, P.C.

(57) ABSTRACT

A fast closing remotely activated animal trap gate includes a gate with a wire mesh and a frame to hold the gate, with the gate moving within the frame between an open position and a closed position. A cable, interacting with a system of weight-reducing pulley wheels, holds the gate within the frame in an open position, and a release rod holds the cable in place. The release rod is retracted in order to allow release of the cable and consequent movement of the gate from the open position to the closed position. In some embodiments, low friction ball-bearing trolley wheels assist in the fast, downward fall of the gate.

13 Claims, 3 Drawing Sheets

REMOTE-ACTIVATED ANIMAL TRAP

CROSS-REFERENCE TO RELATED APPLICATIONS

This application claims the benefit of U.S. Provisional Patent Application Ser. No. 61/872,286, filed Aug. 30, 2013, the entirety of which is hereby incorporated herein by reference.

STATEMENT REGARDING FEDERALLY SPONSORED RESEARCH OR DEVELOPMENT

Not Applicable

BACKGROUND OF THE INVENTION

1. Field of Invention

This invention pertains generally to gates for capturing and managing wild game and, more particularly, to game gates for wild hogs.

2. Description of the Related Art

There is a need for systems and devices that permit the fast, remotely controlled closure of a gate for the purpose of trapping or controlling wild animals, for example wild hogs.

BRIEF SUMMARY OF THE INVENTION

In one example embodiment according to the present general inventive concept, a fast closing remote-activated or remotely activated animal trap gate includes a gate with a wire mesh and a frame to hold the gate, with the gate moving within the frame between an open position and a closed position. A cable, interacting with a system of weight-reducing pulley wheels, holds the gate within the frame in an open position, and a release rod holds the cable in place. The release rod is retracted in order to allow release of the cable and consequent movement of the gate from the open position to the closed position.

In some example embodiments, a fast closing remotely activated animal trap gate includes a substantially stationary frame and a moving gate. The frame generally includes a top frame member and a bottom frame member, with the top frame member being supported by two vertical members. The gate generally includes a wire mesh attached to a gate structure that includes a top piece, a bottom piece, and side pieces. In several embodiments, the gate fits within the frame in such a way that the side pieces of the gate slide within machined channels in the side members of the frame. In some embodiments, the side pieces of the gate move on sealed, low friction ball-bearing wheels within the machined channels in the side members of the frame, assisting the gate to fall as fast as possible.

In order to capture game (such as wild hogs), generally it is preferable for the gate to be capable of closing fast—that is, moving quickly from an open position to a closed position. Generally, the fast closure of the gate is accomplished through the operation of a cable interacting with a release pin or rod. In some example embodiments, a motor or subassembly drives the operation of a release rod that interacts with a conduit housing; the release rod interacts with a cable, and this cable interacts with a pulley system both to hold the gate in an open position and to control and facilitate the movement of the gate from the open position to the closed position. When the gate is in the open position, a first end loop in the cable is wrapped around the release rod. In this position, the rod, supported by the conduit housing, holds the cable (and hence the gate) in place. The length of the cable is routed around a number of weight-reducing pulley wheels: generally, two weight-reducing pulley wheels that are mounted onto the gate, and two weight-reducing pulley wheels that are mounted onto the frame. The other end of the coil includes a second end loop held in place by a cable bolt, which generally is connected to the gate. The pulleys reduce the weight of the gate being held by the release rod.

To close the gate, a wireless signal or other electronic communication is sent to the motor subassembly, within which a receiver receives the signal and conveys it to a controller. The controller then operates a component to retract the release rod, drawing the rod away from the end loop of the cable. When the release rod is retracted, the first end of the cable pulls away from the conduit housing. The full weight of the gate pulls the gate downwards, with the cable passing through the weight-reducing pulley wheels as the gate descends.

In some embodiments of the present general inventive concept, a fast closing remotely activated animal trap gate includes a gate with a wire mesh, a frame to hold said gate, said gate moving within said frame between an open position and a closed position, a cable to hold said gate within said frame in an open position, said cable interacting with a system of weight-reducing pulley wheels, some of said weight-reducing pulley wheels being mounted onto said gate and some of said wheels being mounted onto said frame, a release rod to hold said cable in place, said release rod to be retracted in order to allow release of said cable and movement of said gate from the open position to the closed position, and a motor subassembly to drive the refraction of said release rod, said motor subassembly having a receiver to receive a wireless signal to initiate retraction of said release rod.

In some embodiments, the fast closing remotely activated animal trap gate further comprises a conduit housing to hold said release rod.

In some embodiments, said frame is between 76 and 90 inches in height.

In some embodiments, said frame is between 76 and 120 inches in width.

In some embodiments, the fast closing remotely activated animal trap gate further comprises low friction ball-bearing trolley wheels within machined channels in side members of said frame, said ball bearing trolley wheels assisting in the movement of said gate between the open position and the closed position.

In some embodiments, said system of weight-reducing pulley wheels includes two weight-reducing pulley wheels mounted onto said gate and two weight-reducing pulley wheels mounted onto said frame. Reducing the applied weight on said release rod allows for substantially less force needed to release said rod from cable.

In some embodiments of the present general inventive concept, a fast closing remotely activated animal trap gate includes a gate, a frame to hold said gate, said gate moving within said frame between an open position and a closed position, said frame including machined channels in side members, low friction ball-bearing trolley wheels within said machined channels in said side members of said frame, said ball bearing trolley wheels assisting in the movement of said gate between the open position and the closed position, a cable to hold said gate within said frame in an open position, said cable interacting with a system of weight-reducing pulley wheels, some of said weight-reducing pulley wheels being mounted onto said gate and some of said wheels being mounted onto said frame, a release rod to hold said cable in place, said release rod to be retracted in order to allow release of said cable and movement of said gate from the open position to the closed position, and a motor subassembly to drive the retraction of said release rod, said motor subassembly having a receiver to receive a wireless signal to initiate retraction of said release rod.

A fast closing remotely activated animal trap gate according to the present general inventive concept provides a gate that can be closed quickly in order to trap fast moving animals, without a human operator being physically close to the gate.

BRIEF DESCRIPTION OF THE DRAWINGS

The above-mentioned and additional features of the invention will become more clearly understood from the following detailed description of the invention read together with the drawings in which.

DETAILED DESCRIPTION OF THE INVENTION

In some of its many embodiments, the present general inventive concept includes a gate and a frame to hold the gate, with the gate moving within the frame between an open position and a closed position. A cable, interacting with a system of weight-reducing pulley wheels, holds the gate within the frame in an open position, and a release rod holds the cable in place.

Figure 1:
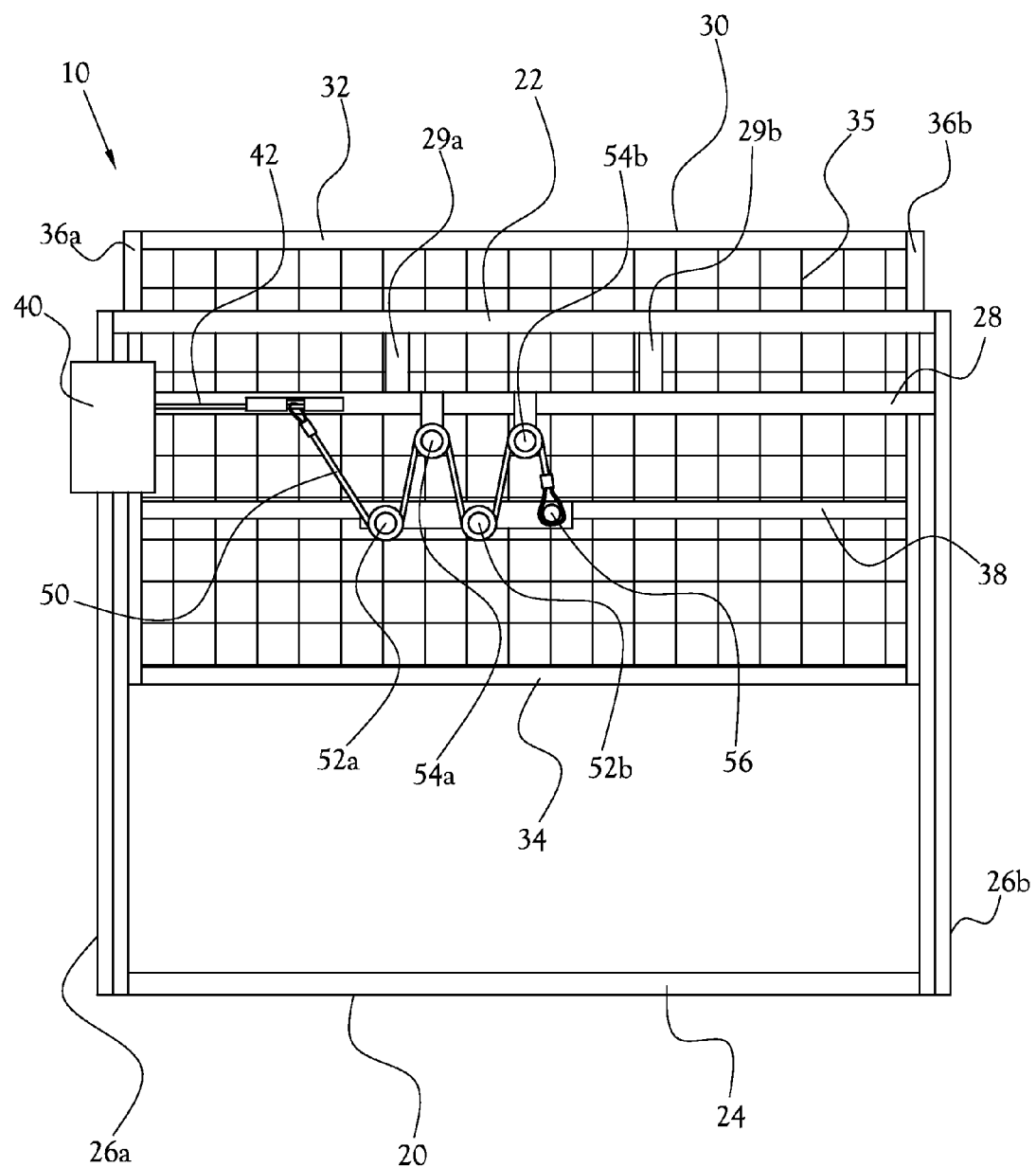
FIG. 1 is a view of one example embodiment of a fast closing remotely activated animal trap gate according to the present general inventive concept, showing the gate in an "up" or open position.

Turning to the figures, FIG. 1 illustrates one example embodiment of a fast closing remotely activated animal trap gate according to the present general inventive concept. In the illustrated example embodiment, a fast closing remotely activated animal trap gate 10 includes a substantially stationary frame 20 and a moving gate 30. The frame 20 generally includes a top frame member 22 and a bottom frame member 24, with the top frame member 22 being supported by two vertical members 26a and 26b. The gate 30 generally includes a wire mesh 35 suspended within a gate structure that includes a top piece 32, a bottom piece 34, and side pieces 36a and 36b. In several embodiments, the gate 30 fits within the frame 20 in such a way that the side pieces 36a and 36b of the gate 30 slide within machined channels in the side members 26a and 26b of the frame 20. In some embodiments, the side pieces 36a and 36b of the gate 30 move on low friction ball-bearing wheels within the machined channels in the side members 26a and 26b of the frame 20.

Figure 2:
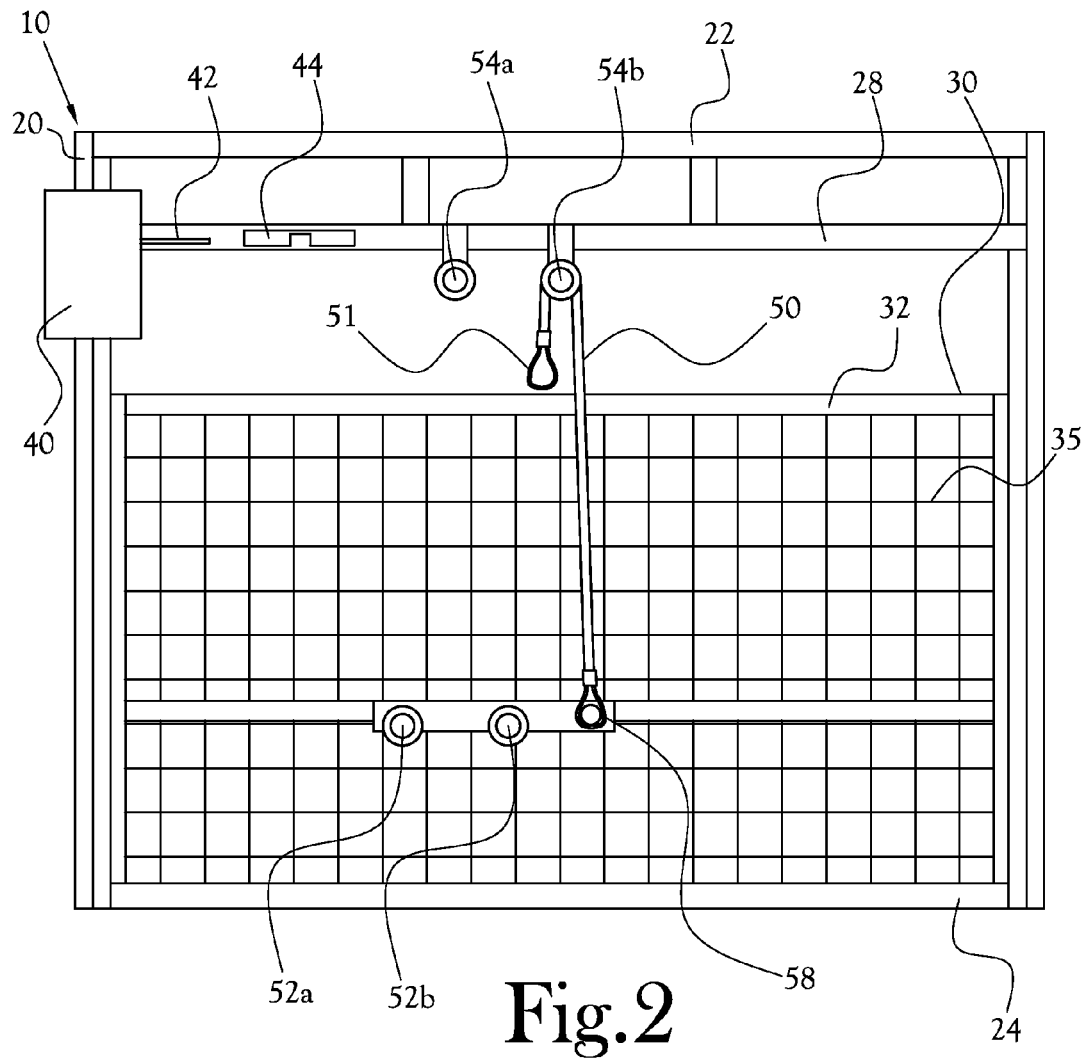
FIG. 2 is a another view of the example embodiment shown in FIG. 1, showing the gate in a "down" or closed position.

FIG. 1 illustrates the example embodiment of a fast closing remotely activated animal trap gate 10 in an "up" or open position (or condition, or state); that is, the gate 30 is elevated some distance above the ground, providing substantial separation (generally between 1 and 4 feet) between the bottom piece 34 of the gate 30 and the bottom frame member 24. FIG. 2 shows the same example embodiment fast closing remotely activated animal trap gate 10 in a "down" or closed position (or condition, or state), in which the gate 30 has been lowered (generally by way of the side pieces 36a and 36b sliding down within the machined channels in the side members 26a and 26b of the frame 20).

Figure 3:
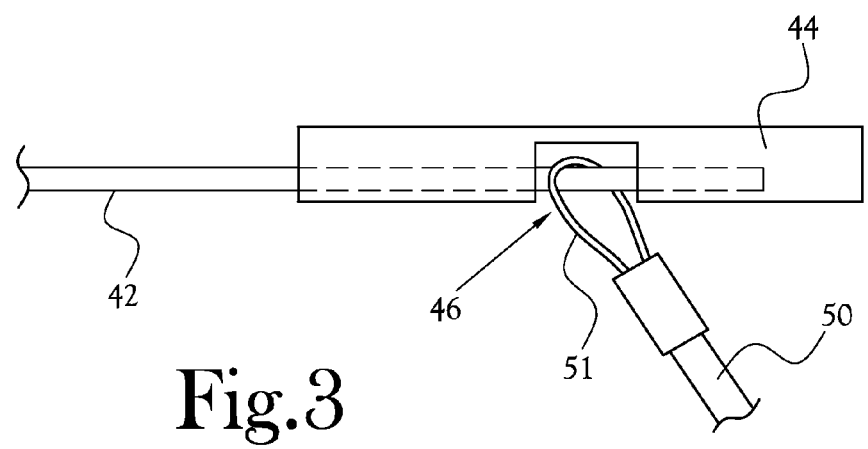
FIG. 3 is a close-up view of an example embodiment of a cable conduit member used in the quick release of the gate.

In order to capture game (such as wild hogs), generally it is preferable for the gate to be capable of closing fast—that is, moving quickly from the open position shown in FIG. 1 to the closed position shown in FIG. 2. Generally, the fast closure of the gate is accomplished through the operation of a cable interacting with a release pin or rod. As shown in FIGS. 1 and 2, and as shown in the close-up view in FIG. 3, the example embodiment device 10 generally includes a motor box or subassembly 40 that drives the operation of a release rod 42 that interacts with a conduit housing 44. (In some embodiments, the conduit housing 44 is fabricated from PVC or a similar low friction material.) The release rod 42 interacts with a cable 50, and this cable 50 interacts with a weight-reducing pulley system both to hold the gate 30 in an open position and to control and facilitate the movement of the gate 30 from the open position to the closed position. When the gate 30 is in the open position, as shown in FIG. 1, a first end loop 51 in the cable 50 is wrapped around the release rod 42, generally through an opening 46 in the conduit housing 44. In this position, the rod 42, supported by the conduit housing 44, holds the cable 50 in place. The length of the cable 50 is wrapped around a number of weight-reducing pulley wheels: two weight-reducing pulley wheels 52a and 52b that are mounted onto a cross-beam 38 in the middle of the gate 30, and two weight-reducing pulley wheels 54a and 54b that are mounted onto a cross-beam 28 that is below the top frame member 22 (and generally connected to the top frame member 22 by at least a pair of connector members 29a and 29b). The other end of the coil 50 includes a second end loop 58 held in place by a cable bolt 56, which is connected to the gate 30.

To close the gate 30, a wireless signal or other electronic communication is sent to the motor box 40, within which a receiver receives the signal and conveys it to a controller. The controller then operates a motor to retract the release rod 42, drawing the rod 42 away from the end loop 51 of the cable 50. When the release rod 42 is retracted, the first end of the cable pulls away from the conduit housing 44. The full weight of the gate 30 pulls the gate downwards, with the cable 50 passing through the weight-reducing pulley wheels as the gate 30 rapidly descends. In some embodiments, low-friction ball-bearing trolley wheels assist in the rapid descent of the gate 30 and reduce the incidence hang ups encountered in other gates in the art.

Figure 4:
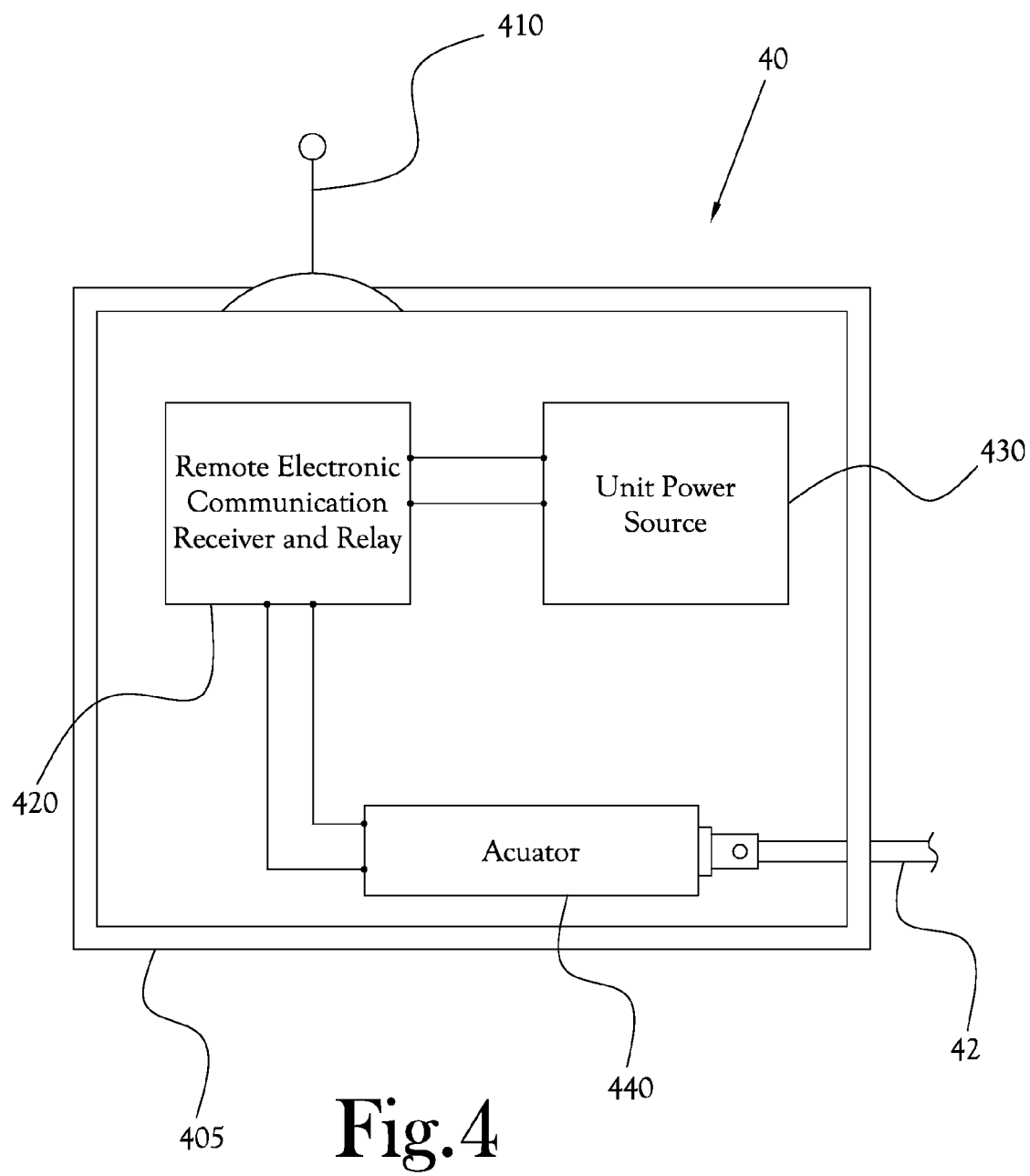
FIG. 4 is a block diagram illustrating the relationship between various components of one example embodiment of a motor box used in connection with a fast closing remotely activated animal trap gate according to the present general inventive concept.

FIG. 4 illustrates generally one example embodiment of the motor box 40 shown in the previous figures. As shown in FIG. 4, the example embodiment motor box 40 includes a housing 405 that holds an external antenna 410 to receive a signal from a remote controller. The external antenna 410 passes the signal to a receiver and relay 420, which draws electricity from a power source 430 and which controls an actuator 440, which drives the release rod 42.

A fast closing remotely activated animal trap gate according to the present general inventive concept provides a gate that can be closed quickly in order to trap wild animals, without a human operator being physically close to the gate (which might frighten animals away from the gate or, alternatively, endanger the human operator). The use of a cable and pulley system reduces the weight of cable and gate on the release rod and makes feasible the use of a quick-acting release rod to effect closure of the gate.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A fast closing remotely activated animal trap gate comprising:
   a gate structure comprising a wire mesh surface and a lower structural member extending along a lower edge of said wire mesh surface;
   a frame to hold said gate structure, said frame comprising a top frame member and a pair of oppositely disposed vertical frame members, said gate structure being slidable along said vertical frame members between an open position and a closed position;
   a first plurality of pulley wheels mounted to said gate structure proximate said lower structural member and a second plurality of pulley wheels mounted to said frame proximate said top frame member;
   a cable configured to hold said gate along said frame in said open position, said cable having a first end anchored to said gate structure proximate said lower structural member, a length configured to extend about and engage alternating ones of said first and second pluralities of pulley wheels, and a second end defining a loop, whereby when said cable length is extended to engage each of said first and second pluralities of pulley wheels in alternating order, said gate structure is moved toward said open position;
   a conduit housing mounted along said frame proximate said top frame member, said conduit housing defining an opening sized to receive said loop of said cable therein;
   a release rod slidably mounted within and along said conduit housing and configured to be extended through said loop within said opening to hold said loop within said opening, thereby securing said gate structure in said open position, said release rod being further configured to be retracted from said loop and said opening in order to allow release of said loop from said opening and movement of said gate from the open position to the closed position; and
   a motor subassembly to drive extension and retraction of said release rod along said conduit housing, said motor subassembly having a receiver to receive a wireless signal to initiate retraction of said release rod.

2. The fast closing remotely activated animal trap gate of claim 1 wherein said frame is between 76 and 90 inches in height.

3. The fast closing remotely activated animal trap gate of claim 1 wherein said frame is between 76 and 120 inches in width.

4. The fast closing remotely activated animal trap gate of claim 1 further comprising a plurality of low friction ball-bearing trolley wheels disposed within machined channels defined along said vertical frame members, said ball bearing trolley wheels assisting in the sliding movement of said gate structure between the open position and the closed position.

5. The fast closing remotely activated animal trap gate of claim 1 wherein said first plurality of pulley wheels includes two pulley wheels mounted to said gate structure and said second plurality of pulley wheels includes two pulley wheels mounted to said frame.

6. The fast closing remotely activated animal trap gate of claim 5, said gate structure further comprising a first cross-beam extending above, and parallel to, said lower structural member.

7. The fast closing remotely activated animal trap gate of claim 6, each of said first plurality of pulley wheels mounted to said first cross beam.

8. The fast closing remotely activated animal trap gate of claim 7, said frame further comprising a second cross-beam extending between said vertical frame members below said top frame member.

9. The fast closing remotely activated animal trap gate of claim 8, each of said second plurality of pulley wheels mounted to said second cross-beam.

10. The fast closing remotely activated animal trap gate of claim 9, said cable first end being anchored to said first cross-beam.

11. The fast closing remotely activated animal trap gate of claim 10, said conduit housing being mounted to, and extending along, said second cross-beam.

12. The fast closing remotely activated animal trap gate of claim 11, said release rod extending parallel to said second cross-beam within and along said conduit housing.

13. The fast closing remotely activated animal trap gate of claim 12, said conduit housing being fabricated from a low friction material.

* * * * *